United States Patent
Harpaz et al.

(10) Patent No.: US 10,316,419 B2
(45) Date of Patent: Jun. 11, 2019

(54) SYSTEM FOR UTILIZING EXCESS HEAT FOR CARRYING OUT ELECTROCHEMICAL REACTIONS

(71) Applicant: NEWCO2FUELS LTD., Rehovot (IL)

(72) Inventors: Roi Harpaz, Rehovot (IL); David Scheiner, Savion (IL)

(73) Assignee: NEWCO2FUELS LTD., Rehovot (IL)

( * ) Notice: Subject to any disclaimer, the term of this patent is extended or adjusted under 35 U.S.C. 154(b) by 292 days.

(21) Appl. No.: 15/028,804

(22) PCT Filed: Sep. 29, 2014

(86) PCT No.: PCT/IL2014/000049
§ 371 (c)(1),
(2) Date: Apr. 12, 2016

(87) PCT Pub. No.: WO2015/052695
PCT Pub. Date: Apr. 16, 2015

(65) Prior Publication Data
US 2016/0251767 A1 Sep. 1, 2016

Related U.S. Application Data

(60) Provisional application No. 61/890,191, filed on Oct. 12, 2013.

(51) Int. Cl.
*C25B 1/04* (2006.01)
*C25B 3/00* (2006.01)
(Continued)

(52) U.S. Cl.
CPC .............. *C25B 15/02* (2013.01); *C25B 1/04* (2013.01); *C25B 3/00* (2013.01); *C25B 9/18* (2013.01);
(Continued)

(58) Field of Classification Search
CPC .......... C25B 15/02; C25B 9/18–9/206; C25B 1/00–1/003; C25B 1/02–1/10
See application file for complete search history.

(56) References Cited

U.S. PATENT DOCUMENTS

| 8,487,010 B1 | 7/2013 | Thomas et al. |
| 2007/0217995 A1 | 9/2007 | Matsumura et al. |
| (Continued) | | |

FOREIGN PATENT DOCUMENTS

| CN | 1922342 A | 2/2007 | |
| WO | WO-2014139822 A1 * | 9/2014 | ............... C25B 1/04 |

OTHER PUBLICATIONS

PCT/EP2013/054871 (Year: 2013).*

*Primary Examiner* — Nicholas A Smith
(74) *Attorney, Agent, or Firm* — Browdy and Neimark, PLLC (57) ABSTRACT

A system and a method are provided for utilizing excess heat generated by an industrial process, in an electrochemical process. The system comprising: an electrochemical reactor for carrying out an electrochemical reaction, wherein the electrochemical reaction requires a pre-defined minimal temperature to be carried out; means operative to receive a gaseous feed stream generated in the industrial process and being at an elevated temperature; an inlet for introducing one or more chemical reactants to the electrochemical reactor; wherein the system is characterized in that the gaseous feed stream temperature is not constant and for at least part of the time, the temperature of the gaseous feed stream received by the system is lower than the required pre-defined minimal temperature.

12 Claims, 4 Drawing Sheets

(51) Int. Cl.
*C25B 9/18* (2006.01)
*C25B 15/02* (2006.01)
*C25B 15/08* (2006.01)

(52) U.S. Cl.
CPC ............... *C25B 15/08* (2013.01); *Y02E 20/12* (2013.01); *Y02E 20/36* (2013.01); *Y02E 60/366* (2013.01)

(56) References Cited

U.S. PATENT DOCUMENTS

| | | |
|---|---|---|
| 2008/0023338 A1 | 1/2008 | Stoots et al. |
| 2009/0235587 A1 | 9/2009 | Hawkes et al. |
| 2010/0146927 A1 | 6/2010 | Mccutchen et al. |
| 2011/0041740 A1 | 2/2011 | Reilly |

* cited by examiner

SYSTEM FOR UTILIZING EXCESS HEAT FOR CARRYING OUT ELECTROCHEMICAL REACTIONS

TECHNICAL FIELD

The present disclosure generally relates to systems and methods for utilizing excess heat, and more particularly, to systems and methods for utilizing excess heat emitted at varying operating conditions.

BACKGROUND

One of the known problems associated with many industrial factories operating under elevated temperatures is the generation of excess heat emitted from the facility, which is not effectively utilized.

Although there could be a substantial potential of energy content in the outgoing gases, still, the typical problem associated with utilizing this potential is the fact that the hot gaseous feed stream is a by-product generated on a transient basis, e.g., an outcome of batch processes, non-constant generation of the by-product hot gases, and the like. Thus, it would be virtually impossible to rely on an essentially non-constant hot gases feed or even intermittent feed of hot gases, for running a continuous process using this heat, which is desired from economical point of view.

One way of solving this problem, is by including a storage in the system for storing the hot gases leaving the process and drawing a constant hot gaseous feed from that storage. However, this solution is impractical due to the costs associated with the need to store and compress the gases at elevated temperatures.

Another way to obtain an intermediate storage is to use a phase changing material in which the heat can be stored. However, once again the costs involved with such a process and the loss of process efficiency (due to the reduction of the temperature in the storage and retrieval processes), render this solution impractical.

Yet another way to obtain such a storage is by using materials which have high heat capacity (e.g. refractory bricks through which hot gas carrying the excess heat flows) and by heating this media, the excess heat is stored as sensible heat. Again, this solution suffers from similar disadvantages as the solutions referred to above.

In view of that, there is a need to obtain a solution that would enable utilizing the excess heat and consequently to increase the overall efficiency of the process in which the excess heat is generated.

SUMMARY OF THE DISCLOSURE

The disclosure may be summarized by referring to the appended claims.

It is an object of the present disclosure to provide a system and a method for utilizing excess heat emitted in industrial processes.

It is another object of the present disclosure to provide a method and a system for using excess heat for carrying out electrochemical reactions, while the excess heat is provided at varying conditions.

Other objects of the present invention will become apparent from the following description.

According to a first aspect of the disclosure there is provided a system for utilizing excess heat generated by an industrial process in an electrochemical process, the system comprising:

an electrochemical reactor for carrying out an electrochemical reaction, wherein the electrochemical reaction requires (i.e. in order to achieve a reasonable process efficiency) a pre-defined minimal temperature to be carried out;

means operative to receive a gaseous feed stream generated by the industrial process and being at an elevated temperature;

an inlet for introducing one or more chemical reactants to the electrochemical reactor;

wherein the system is characterized in that the temperature of the gaseous feed stream is not constant, and for at least part of the time the temperature of the gaseous feed stream received by the system, is lower than the required pre-defined minimal temperature.

According to another embodiment, the system comprising a plurality of sections arranged in series, wherein each of the sections comprises at least one electrochemical reactor and at least one combustor, and wherein the gaseous feed stream is introduced at each electrochemical reactor after being heated in a combustor to a temperature that is equal to or greater than the required pre-defined minimal temperature.

In accordance with another embodiment, the gaseous feed stream comprises one or more residues of compounds selected from a group that consists of: energy containing compounds, flammable compounds, toxic compounds and the like, and wherein the system further comprises an auxiliary ingress to enable introducing an oxidizing agent to the system and a combustor configured to combust said residues, thereby raising the temperature of the gaseous feed stream to a temperature that is equal to or greater than the required pre-defined minimal temperature. The one or more residues may be for example CO or $H_2$ or a combination thereof and the oxidizing agent may be for example oxygen or air or a combination thereof.

According to another embodiment, the electrochemical reactor is at least partially located within a cavity of a chamber at which the industrial process excess heat is generated. In addition, a jacket can be placed around the electrochemical reactor located within the chamber and the jacket may be used as a buffer to regulate the reactor temperature.

The term "chamber" is used herein throughout the specification and claims to denote an enclosures within which excess heat is generated.

By yet another embodiment, the industrial process is a member of a group that consists of: cement manufacturing process, glass manufacturing process, steel manufacturing process, aluminum manufacturing process, gasification, biogas combustion, incineration, reforming process and electricity generation.

According to still another embodiment, the electrochemical reaction is dissociating $CO_2$ and/or $H_2O$.

In accordance with another embodiment, the system further comprising means operative to introduce electrical current to said system, wherein this means is operative to increase the electric current being introduced to the system upon reduction of the incoming energy of the gaseous feed stream.

According to another aspect of the present disclosure, there is provided a method for utilizing excess heat generated in an industrial process, in an electrochemical process. The method comprises the steps of:

providing an electrochemical reactor for carrying out an electrochemical reaction, wherein said electrochemical reaction requires a pre-defined minimal temperature;

receiving a gaseous feed stream generated by the industrial process and being at an elevated temperature;

introducing one or more chemical reactants to the electrochemical reactor;

wherein the method is characterized in that the gaseous feed stream temperature is not constant and for at least part of the time the temperature at which the gaseous feed stream is received, is lower than the required pre-defined minimal temperature.

According to another embodiment of this aspect, the method further comprising: providing a plurality of sections arranged in series, wherein each of the sections comprises at least one electrochemical reactor and at least one combustor, and wherein in case the temperature of the gaseous feed stream is lower than the required pre-defined minimal temperature, the gaseous feed stream is introduced at an electrochemical reactor after being pre-heated in a combustor to a temperature that is equal to or greater than the required pre-defined minimal temperature.

In accordance with another embodiment, the step of receiving a gaseous feed stream comprises receiving a gaseous feed stream that comprises one or more residues of compounds selected from among energy containing compounds, flammable compounds and toxic compounds, and wherein the method further comprises a step of introducing an oxidizing agent to combust said residues, thereby raising the temperature of the gaseous feed stream to a temperature that is equal to or greater than the required pre-defined minimal temperature. As will be appreciated by those skilled in the art, the one or more residues may be comprised in the gaseous feed stream as a result of adding them to that stream after the latter has been emitted from the industrial process or as by-products included in the gaseous feed stream when it is emitted from the industrial process.

By yet another embodiment of this aspect of the invention, the electrochemical reactor is at least partially located within a cavity of a chamber at which the industrial process excess heat is generated.

According to still another embodiment of this aspect of the invention, the industrial process is a member of a group that consists of: cement manufacturing process, glass manufacturing process, steel manufacturing process, aluminum manufacturing process, gasification, biogas combustion, incineration, reforming process and electricity generation.

BRIEF DESCRIPTION OF THE DRAWING

For a more complete understanding of the present invention, reference is now made to the following detailed description taken in conjunction with the accompanying drawings wherein.

DETAILED DESCRIPTION

In the following description, for the purposes of explanation, numerous specific details are set forth in order to provide a better understanding of the present invention by way of examples. It should be apparent, however, that the present invention may be practiced without these specific details.

The system provided by the present disclosure aims to enable combining an electrochemical reactor with facilities at which high temperature processes are being carried out, whereas at least some of the heat generated in these processes, is currently emitted from the facility in a form of hot gaseous output, without fully utilizing the energetic potential contained in the emitted gases. Although there could be a substantial potential of energy content in the outgoing gases, still, the typical problem associated with utilizing this potential is the fact that the hot gases output is a byproduct generated on a transient basis, e.g., an outcome of batch processes, non-constant generation of the byproduct hot gases, being at varying temperatures and the like. Thus, it would be virtually impossible to rely on an essentially non-constant hot gases feed, for carrying out a continuous process, which is desired from the economical point of view, and one that requires a minimal operating temperature in order to be carried out on a commercial basis.

Therefore, according to the present invention there is provided a system for utilizing excess heat which includes an electrochemical reactor which enables capturing otherwise wasted (or at least partially wasted) energy in the form of hot gases being by-product of industrial processes. Such industrial processes may be carried out for example in cement factories, glass manufacturing, steel foundries, aluminum foundries, gasification plants, biogas combustors, incinerators, reformers, chemical plants, electricity generation plants, and the like.

One of the advantages which is inherent to the solution proposed herein is the fact that the excess heat retrieved from the industrial process at varying temperatures, may be used in an electrochemical process which is carried out under essentially constant working conditions and in which a minimal temperature threshold is required.

An example for such an electrochemical reactor, is when the electrochemical reactor is a gas dissociation reactor to which $CO_2$ and/or $H_2O$ is/are introduced as input gases and the reactor's output are CO and/or $H_2$ (in addition to remaining input gas) and $O_2$. The external heat source, reaching the reactor in a form of hot gas, is utilized for providing energy to the dissociation process and optionally for creating electrical energy that is also required for the process. In certain cases, where the excess heat is carried within $CO_2$ being one of the gases (or the only one)emitted from the industrial process in which the excess heat is generated, the electrochemical reactor of the present disclosure may be advantageously used to dissociate this gas, thereby preventing direct emission of $CO_2$ into the atmosphere.

The following examples demonstrate various configurations for extraction of excess heat from industrial processes and its utilization in a system that comprises a heated electrochemical reactor, where such a system includes a reactor receiving thermal energy from an external heat source and electrical energy from an electrical source.

The excess heat may be extracted from, for example, furnaces, combustion chambers, process chambers, incinerators, gasifiers and the like. The term "process chamber" (or simply "chamber") is used herein throughout the specification and claims to denote these or other enclosures within which the excess heat is generated.

The heat source extracted from the chamber may be in the form of heat derived from radiation, a convective flow therein or a conducting media, in the chamber.

In certain cases the heat may be extracted directly from the chamber's cavity, such as in a cavity of a combustion exhaust. The heat may be extracted from the chamber cavity by convection, by radiation or by conduction. The heat may also be absorbed directly into the gas dissociation (i.e. electrochemical) reactor by conveying the hot gas directly into the reactor's cavity.

In other cases, heat may be extracted from within the chamber (e.g. dissipated from the walls surrounding the chamber cavity), for example between an internal layer of a refractory material and an external metal casing. The heat may be extracted by convection, by radiation, by conduction or by any combination thereof.

Furthermore, heat may be extracted by using a pipe, a large surface area device using fins, multiple pipes, a heat exchanger or the like.

Heat may be transferred by a heating fluid such as a hot gas, a phase changing material (such as a molten salt) or a flow of heated solid particles.

Figure 1:
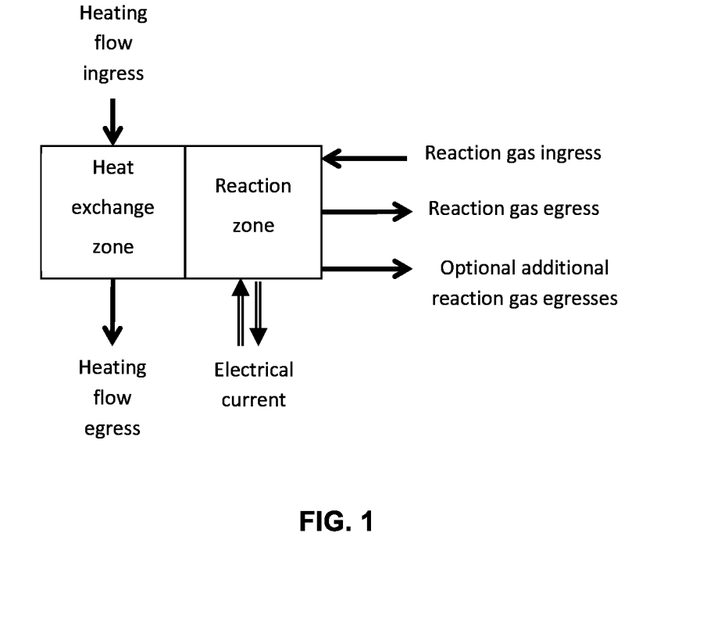
FIG. 1 is a schematic block diagram of an example of a system according to an embodiment of the present invention.

According to an embodiment of the disclosure, the system demonstrated in FIG. 1 comprises an electrochemical reactor (e.g. the gas dissociation reactor) being the reaction zone, a heat exchange zone, heating flow (i.e. the gaseous feed stream) ingress and egress means, reacting gas ingress and at least one reaction gas egress means and ingress and egress means for introducing electric current to the system. Sensors are installed in this arrangement to enable controlling parameters such as the reactor temperature, heating rate, fluid and gas flow rates, reaction rate, gas composition and pressures As mentioned above, heat may be extracted from the chamber in a number of ways. For example, heat may be extracted by inserting a pipe or heat exchanger into the cavity or from the wall(s) of the heat source, whereby a gaseous feed stream is heated by radiation and/or convection and conveyed via an insulated pipe to heat consuming stations requiring the thermal energy such as the reactor section or a thermal electricity generator. In another embodiment, the fluid (e.g. gas present in the chamber) may be used as the heating flow and be conveyed via an insulated pipe to the heat consuming stations. Various usage stations may receive the heating flow either in series or in parallel. As will be appreciated by those skilled in the art, the order by which the heat consuming stations receive the thermal energy may be different in various implementations, depending for example on the temperature at which the heat should be consumed at a respective one of the stations. In addition, after providing the thermal energy to one of the heat consuming stations, the gaseous feed stream may be either circulated back to the heat source, conveyed downstream towards additional one or more heat consuming stations or emitted from the system.

In another embodiment, the gaseous feed stream enters the heat exchange zone of the electrochemical reactor and transfers the thermal energy via convection or radiation to the reaction zone. In a specific embodiment, the thermal energy from the gaseous feed stream may be extracted directly at the reaction zone of the reactor by convective heat transfer.

By yet another embodiment, the electrochemical reactor is powered at least partially by electrical energy derived from an electrical source, and by thermal energy derived from a heating flow. In one embodiment, high temperature flue gas leaving a furnace could be used directly as the heating flow. In a further embodiment, the thermal energy is absorbed by the heating flow through a heat exchanging mechanism with a high temperature flue gas. Certain furnaces could be found in various industries such as cement factories, glass manufacturing, steel foundries, aluminum foundries, gasification plants, biogas combustors, incinerators, reformers, chemical plants and electricity generation plants. The heating flow may contain residual oxygen or residual fuel, for example resulting from the need for an oxidizing or reducing environment within the furnace. In case that the heating flow comprises residual fuel, the emitting industrial plant would be required in many cases to burn the heating flow in a flare in order to ensure that the residual fuel is not emitted, thus wasting usable energy.

Figure 2:
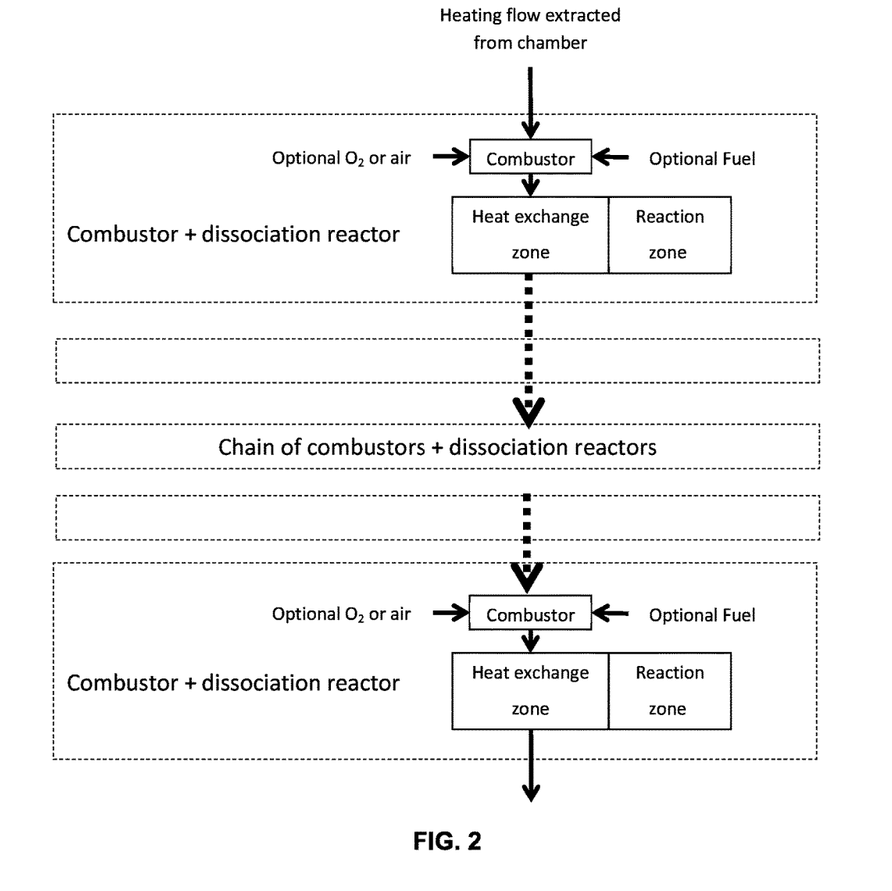
FIG. 2 is a schematic block diagram illustrating the use of a number of sections each comprising an electrochemical reactor and a combustor which are installed in series, according to another embodiment of the present invention.

The heating flow (i.e. gaseous feed stream) provides thermal energy at high temperature to the reactor or other heat consuming stations, and during the process of providing the thermal energy, it would obviously be cooled down. Thus, as may be seen in FIG. 2, before entering any of the electrochemical reactors (e.g. after egressing a reactor), the heating flow may be reheated by a combustor, essentially compensating for the thermal energy removed from the heating flow within the reactor, and thus the temperature of the heating flow may be raised back to its original value (i.e. prior to the interaction with the reactor). The heating flow may then be diverted to another reactor, followed by another combustor and so on, thereby creating a chain of at least one high temperature section where each reactor is followed by a post combustor. The combustors may rely on burning residual fuel comprised in the heating flow while adding oxygen to the combustion process, or in the alternative, the combustors may rely on burning residual residual oxygen comprised in the heating flow while adding fuel to the heating flow. In another alternative, both fuel and oxygen may be added for the combustion. In a further embodiment, excess fuel and excess oxygen may be added in alternate units installed in a serial configuration. Furthermore, even before entering the present system (i.e. before reaching any electrochemical reactor of the present invention) the temperature of the gaseous feed stream received from the chamber may be too low. Thus, as may be seen in FIG. 2, before entering any of the electrochemical reactors (e.g. after egressing the chamber), the heating flow may be preheated by a combustor.

The system described herein, has the advantage of reusing thermal energy derived from a high temperature source and only compensating for the highest temperature heat portion utilized by the reactors, thus avoiding the energy that would otherwise be consumed by heating the heating flow for each reactor from ambient temperature to the required working temperature.

Figure 3:
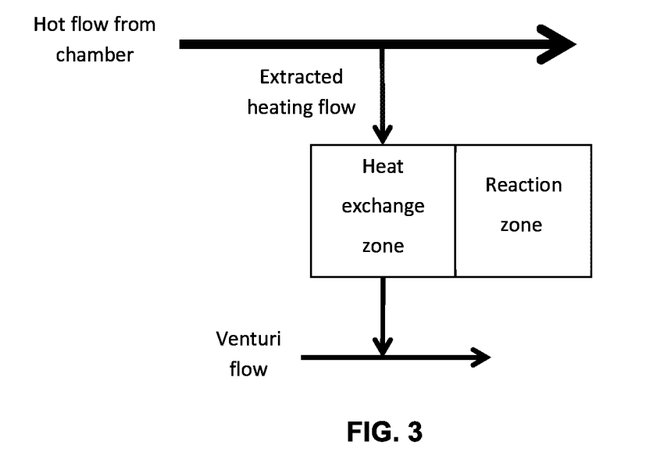
FIG. 3 exemplifies the use of a Venturi type pump to boost the pressure of the incoming feed stream.
Figure 4:
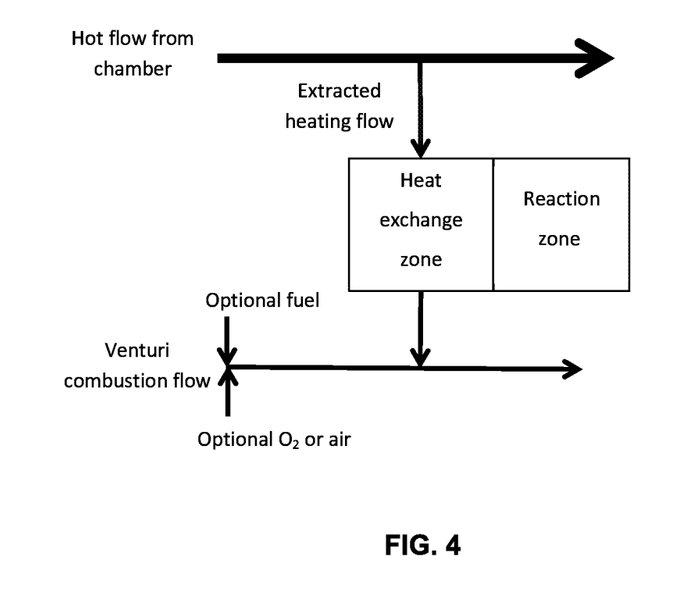
FIG. 4 exemplifies the use of a Venturi type pump to provide an oxidizing agent to a combustor.

In cases when the pressure drop in the heating flow is too high to allow a free flow through one or a series of reactors and combustors, in which there will be a need for at least one pump in the series to provide the required flow. The pump may be located in various points along that series of reactors and combustors. For example, such a pump could rely on the Venturi effect (FIG. 3) and moreover, such a pump could be used to draw oxidizing agent (e.g. air, oxygen) (FIG. 4) which is then used as a feed to a combustor (e.g. in a way that was described above).

In another example, where the electrochemical reactor is a gas dissociation reactor and the output products of the dissociation are CO and/or $H_2$ and oxygen, the source of fuel and/or oxygen to be provided to the combustor could be from partial recycling of the reactor's outputs. However, in such cases, the efficiency of the dissociation process increases at higher working temperature, thereby compensating for the partial consumption of output products.

The recycling may be carried out directly from the reactor to a combustor within the same section, or it could be done by using a central storage containing the combined outputs that had been retrieved from a number of reactors belonging to the same series of reactors (the chain of reactors). In the alternative, the fuel and/or oxygen may be provided from external sources.

Let us consider the following example where the industrial facility with which the system of the present disclosure is associated, is a gasification plant and the chamber is a gasifier for gasifying coal or biomass or any other applicable material, where the heat generated within the gasifier cavity is at the temperature range of 1000° C. to 1600° C. The excess heat may be extracted directly from the combustion zone and/or from a radiating zone and/or from an area between located the combustion zone and the radiating zone and/or from the walls of the gasifier and/or from any other areas thereof. The extraction of the excess heat may be done by using a fluid flowing through pipes in any of the above regions of the gasifier, where the fluid could be a gas, a liquid or a flow of solid particles.

While operating, the gasifier plant emits $CO_2$ as a by-product of the gasification process which may be utilized as an input gas for the electrochemical process of the present disclosure. In the electrochemical reactor, the $CO_2$ is dissociated into CO and $O_2$. In certain gasification plants, $O_2$ is generated by using an air separation unit and is then used as the oxidant agent for the combustion process. The $O_2$ produced by the electrochemical reactor may be added to the $O_2$ flow thus reducing the cost of $O_2$ generation for the facility. $H_2O$ may be added to the input gas for the electrochemical reaction, either separately or together with the $CO_2$. The output product of the electrochemical reactor may be a mixture of CO and $H_2$, referred to as syngas, which can be added to the syngas produced by the gasifier. The effectiveness of the utilization of the various gases ($CO_2$, $H_2O$, $O_2$, syngas) may be further enhanced by placing storage buffers along the piping between the heat source and point of use of the gases.

The following example relates to a facility that comprises the system according to an embodiment of the present invention. However it should be noted that even prior to installation of the present system, some of the excess heat exiting the chamber had already been in use, for instance for recuperative preheating of incoming raw material used by the facility. After installing the system of the present invention, a part of the excess heat is used as the thermal energy required in the gas dissociation reactor by diverting the heating flow through that reactor, and the heating flow that leaves the dissociation reaction (at a somewhat lower temperature, due to the heat consumed by the dissociation reaction), resumes its regular path and is used for preheating the incoming raw material. In many cases where high temperature chambers are involved, not all of the heat is utilized under normal operating conditions, instead, the temperature is first reduced to a more convenient level prior to transferring the heat to the incoming material by the recuperator. The use of the system of the present invention enables utilization of that wasted heat at the high temperatures, thus reducing waste of certain portion of the excess heat generated.

The electricity required for the gas dissociation process may be derived from an additional power source. The source may be the electrical grid or renewable power sources such as: photovoltaic cells, wind turbines, etc.

In case the electrical power supply to the electrochemical process is not kept essentially constant, a heat conditioning module is used for adjusting the rate of heating flow comprising the excess heat derived from the facility, in order to control the production rates of the gas dissociation reactor. This conditioning may also be used when the heating flow coming from the chamber cannot be used directly in the electrochemical reactor due to any reason such as material incompatibility issues or contamination issues. In this case, a two-step heat exchanger may be used for example to allow transfer of the heat between two different fluids. In addition, as would be appreciated by those skilled in the art, the heat conditioning module may be used for adjusting the electricity intake in case that the thermal energy contained in the heating flow is not kept essentially constant.

In another embodiment of the present disclosure, the system of the invention consumes the thermal energy required for the gas dissociation process, after which the heating flow (at a reduced temperature) is diverted to the electrical power generation block, whereby the heat is used to generate electricity needed for the gas dissociation process, for example by using one or more turbines and/or one or more heat engines. In addition to the previous options described above, in some cases the reaction products existing the gas dissociation reactor may be fed back to the facility. For example, oxygen can be added to the air flow used in elements such as combustion chambers and gasifiers in order to improve the combustion characteristics.

The following examples demonstrate certain configurations for extracting excess heat from facilities for using it in a heated electrochemical system.

According to one example, there is provided a system comprising an electrochemical reactor, means to convey excess heat from a chamber wherein a high temperature region exists to the electrochemical reactor, means to convey electrical energy from an electric source to the system, wherein the electrochemical reactor is configured to utilize the heat conveyed thereto both from the chamber and from the electrical energy source in order to carry out the electrochemical reaction. Once the incoming rate of the thermal energy changes, e.g. due to changes in the process in which the excess heat is generated, the system is adapted to draw more electrical energy from the electric source, thereby compensating for the lack of energy available for carrying out the electrochemical reaction, and to enable maintaining a substantially constant flow of products of the electrochemical reaction.

The following example (illustrated in FIG. 5) describes a system for carrying out a $CO_2+H_2O$ dissociation reaction according to an embodiment of the present invention for producing syngas and $O_2$.

Figure 5:
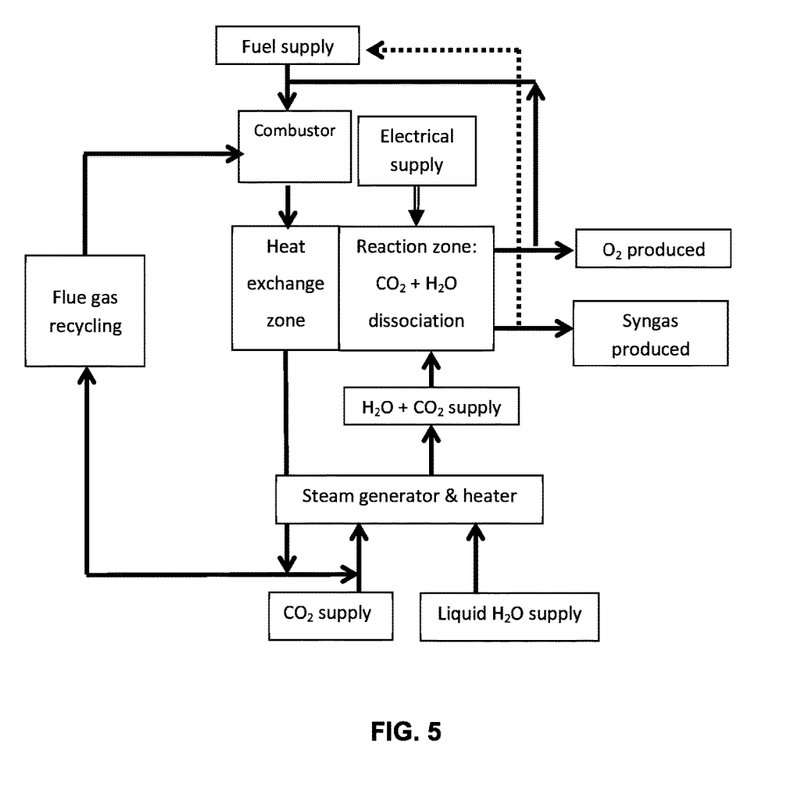
FIG. 5 is a general schematic block diagram of an example of an industrial process combined with a system construed according to an embodiment of the present invention.

The electrochemical reactor is powered by electrical and thermal energy. The thermal energy is supplied to the reactor by a high temperature flue gas exiting a furnace which burns gaseous fuel. The flue gas may be extracted from a region of the flue pipe in which the combustion is not fully complete, and consequently the flue gas comprises residues of energetic/flammable/toxic compounds such as CO and $H_2$. The flue gas, acting as a heating flow, enters the electrochemical reactor and transfers at least part of its thermal energy to the reaction zone, for example by using a heat exchanger. An oxidizing gas such as air or oxygen may be added to the heating flow in order to complete the combustion of the residual energetic compounds, thereby increasing the thermal energy content of the flue gas (as well as its temperature) and at the same time getting rid of these residual compounds. The combustion of these residuals contained in the flue gas also reduces safety measures that would otherwise be required for handling the existing flue gas from the chamber. The oxidizing agent may be added to the flue gas within the reactor or may be added prior to its entry to the reactor (e.g. in a combustor). The additional thermal energy added to the heating flow within the reactor may compensate for thermal losses associated with the system or increase the process temperature to one which is higher than that of the available heat source. By way of example, this embodiment can be utilized in furnaces used for heat treatment of materials where a reducing environment is required. In such furnaces, air is usually added to the flue gas after its leaves the process area in order to ensure oxidizing of the residues.

The following example describes an example of a system for carrying out a $CO_2+H_2O$ dissociation reaction according to another embodiment of the present invention for producing syngas and $O_2$.

Once again, the electrochemical reactor is powered by electrical and thermal energy. The heating flow is conveyed from the chamber (of the industrial process) to the reactor and its thermal energy content is used to heat the heat exchange zone of the reactor to the desired operating temperature. The reactant gases that are introduced at the reactor gas ingresses for carrying out the dissociation reaction of $CO_2$ and/or $H_2O$. CO and $H_2$ are added to the reaction gases forming a reaction gas mixture. The reaction gas mixture is then heated to a temperature that is close to the reaction temperature by heat exchanging mechanism with the heating flow, prior to its entrance to the reaction zone, preferably in a heat exchange zone. In a specific embodiment, oxygen may also be added to the reaction gas mixture prior to entering the reaction zone. The combustion of the oxygen with at least part of the CO and $H_2$ contained in the reaction gas mixture, adds thermal energy and consequently increases the temperature of the reaction gas mixture entering the reaction zone. The additional thermal energy added to the reaction gas mixture within the reactor can increase the process efficiency, compensate for thermal losses in the system and/or increase the temperature to a temperature which is higher than that of the available heat source.

By another embodiment, the reaction gas mixture may contain oxygen in addition to the reaction gases of $CO_2$ and/or $H_2O$. The reaction gas mixture is heated to a temperature which is close to that of the reaction temperature by exchanging heat with the heating flow, prior to entering the reaction zone, preferably in a heat exchange zone. Combustible gases such as CO and/or $H_2$ may be added to the reaction gas mixture prior to entering the reaction zone. The combustion of the oxygen with at least part of the CO and/or $H_2$ contained in the reaction gas mixture, adds thermal energy and consequently increases the temperature of the reaction gas mixture entering the reaction zone.

In this disclosure, the term "comprising" is intended to have an open-ended meaning so that when a first element is stated as comprising a second element, the first element may also include one or more other elements that are not necessarily identified or described herein, or recited in the claims.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A system for utilizing in an electrochemical process, excess heat generated by an industrial process, said system comprising:
    an electrochemical reactor for carrying out an electrochemical process, wherein said electrochemical process requires a pre-defined minimal temperature to be carried out;
    means operative to receive a gaseous feed stream generated in the industrial process, said gaseous feed stream being at a varying elevated temperature which at least part of the time is lower than said pre-defined minimal temperature required for carrying out the electrochemical reaction, and to convey said gaseous feed stream into said system, said electrochemical reactor comprising a reaction zone and a heat exchange zone, wherein the heat exchange zone is heated by the gaseous feed stream and the heat exchange zone transfers the thermal energy via convection or radiation to the reaction zone;
    an inlet for introducing one or more chemical reactants to the electrochemical; reactor and at least one reaction gas egress means for discharging output products from said electrochemical reactor;
    a product conveying means configured to convey output products discharged from said electrochemical reactor;
    a combustor comprising at least one ingress means for introducing thereat products of said electrochemical reaction, wherein said combustor is operative to combust said products of the electrochemical reaction for raising temperature of the gaseous feed stream when said temperature of the gaseous feed stream received at the system is lower than the required pre-defined minimal temperature, thereby ensuring that the gaseous feed stream is introduced to said electrochemical reactor at a temperature that is equal to or greater than the required pre-defined minimal temperature; and
    a recycling means, operative to convey part of the products generated at the electrochemical reactor to the combustor.

2. The system of claim 1, said system comprising a plurality of sections arranged in series, wherein each of the sections comprises at least one electrochemical reactor comprising a reaction zone and a heat exchange zone, wherein the heat exchange zone is heated by the gaseous feed stream and the heat exchange zone transfers the thermal energy via convection or radiation to the reaction zone and at least one combustor comprising at least one ingress means for introducing thereat products of said electrochemical reaction, wherein said combustor is operative to combust said products of the electrochemical reaction for raising temperature of the gaseous feed stream when said temperature of the gaseous feed stream when received from the preceding section is lower than the required pre-defined minimal temperature, thereby ensuring that the gaseous feed stream is introduced to the at least one electrochemical reactor belonging to a respective section, at a temperature that is equal to or greater than the required pre-defined minimal temperature, and
    a recycling means, operative to convey part of the products generated at the electrochemical reactor to a combustor.

3. The system of claim 2, wherein said recycling means are operative to convey part of the products generated at the electrochemical reactor, to a combustor located within the same section as said electrochemical reactor at which said part of the products were generated.

4. The system of claim 2, wherein said recycling means are operative to convey part of the products generated at the electrochemical reactor, to a central storage means.

5. The system of claim 1, wherein the gaseous feed stream comprises one or more residues of compounds selected from among energy containing compounds, flammable compounds and toxic compounds, and wherein the system further comprises an auxiliary ingress to enable introducing an oxidizing agent to the system and a combustor configured to combust said residues, thereby raising the temperature of the gaseous feed stream to a temperature that is equal to or greater than the required pre-defined minimal temperature.

6. The system of claim 1, wherein said electrochemical reactor is at least partially located within a cavity of a chamber at which the industrial process excess heat is generated.

7. The system of claim 1, wherein said industrial process is a member of a group that consists of: cement manufacturing process, glass manufacturing process, steel manufacturing process, aluminum manufacturing process, gasification, biogas combustion, incineration, reforming process and electricity generation.

8. The system of claim 1, further comprising means operative to introduce electrical current to said system, wherein said means is operative to increase the electric current being introduced to the system upon reduction of the incoming thermal energy of the gaseous feed stream.

9. A method for utilizing in an electrochemical process, excess heat generated by an industrial process, said method comprises the steps of:
providing an electrochemical reactor for carrying out an electrochemical process, wherein said electrochemical process requires a pre-defined minimal temperature in order to be carried out;
receiving a gaseous feed stream generated in the industrial process being at a varying elevated temperature which at least part of the time is lower than said pre-defined minimal temperature required for carrying out the electrochemical reaction;
heating a heat exchange zone of said electrochemical reactor by the gaseous feed stream and transferring the thermal energy to the reaction zone of said electrochemical reactor;
introducing one or more chemical reactants to the electrochemical reactor;
discharging products of said electrochemical reaction from said electrochemical reactor;
recycling part of the discharged products of said electrochemical reaction to a combustor;
introducing recycled products of said electrochemical reaction to said combustor, wherein said combustor is operative to raise temperature of the gaseous feed stream when said temperature of the gaseous feed stream received is lower than a required pre-defined minimal temperature, thereby ensuring that the gaseous feed stream is introduced to said electrochemical reactor at a temperature that is equal to or greater than the required pre-defined minimal temperature.

10. The method of claim 9, further comprising providing a plurality of sections arranged in series, wherein each of the sections comprises at least one electrochemical reactor and at least one combustor, and wherein in case the temperature of the gaseous feed stream is lower than the required pre-defined minimal temperature, the method comprising introducing the gaseous feed stream into an electrochemical reactor after being heated in a combustor to a temperature that is equal to or greater than the required pre-defined minimal temperature.

11. The method of claim 9, wherein the step of receiving a gaseous feed stream comprises receiving a gaseous feed stream that comprises one or more residues of compounds selected from among energy containing compounds, flammable compounds and toxic compounds, and wherein the method further comprises a step of introducing an oxidizing agent to combust said residues, thereby raising the temperature of the gaseous feed stream to a temperature that is equal to or greater than the required pre-defined minimal temperature.

12. The method of claim 9, wherein said industrial process is a member of a group that consists of: cement manufacturing process, glass manufacturing process, steel manufacturing process, aluminum manufacturing process, gasification, biogas combustion, incineration, reforming process and electricity generation.

* * * * *